(12) United States Patent
Scrafford et al.

(10) Patent No.: US 8,554,692 B2
(45) Date of Patent: Oct. 8, 2013

(54) SYSTEM AND METHOD TO VALIDATE CONSUMABLES INSTALLED IN A PRINTING SYSTEM

(75) Inventors: Matthew O. Scrafford, Fairport, NY (US); Jason C. Tsongas, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 100 days.

(21) Appl. No.: 13/077,054

(22) Filed: Mar. 31, 2011

(65) Prior Publication Data

US 2012/0254050 A1    Oct. 4, 2012

(51) Int. Cl.
G06Q 99/00    (2006.01)
A01K 5/02    (2006.01)

(52) U.S. Cl.
USPC .......................................... 705/317; 705/29

(58) Field of Classification Search
None
See application file for complete search history.

(56) References Cited

U.S. PATENT DOCUMENTS

| | | | |
|---|---|---|---|
| 4,961,088 A * | 10/1990 | Gilliland et al. | 399/25 |
| 6,947,964 B2 | 9/2005 | Nishio | |
| 6,981,036 B1 | 12/2005 | Hamada | |
| 7,146,112 B2 | 12/2006 | Phipps et al. | |
| 7,237,771 B2 | 7/2007 | Lang et al. | |
| 7,529,491 B2 | 5/2009 | Rommelmann et al. | |
| 7,574,489 B2 | 8/2009 | Motoyama et al. | |
| 7,580,936 B2 | 8/2009 | Salgado | |
| 7,618,138 B2 * | 11/2009 | Rodriguez et al. | 347/88 |
| 7,644,145 B2 | 1/2010 | Rockwell | |
| 7,726,556 B2 | 6/2010 | Beabes et al. | |
| 2002/0087470 A1 | 7/2002 | Hayes et al. | |
| 2002/0196463 A1 | 12/2002 | Schlonski et al. | |
| 2003/0038958 A1 | 2/2003 | Salgado et al. | |
| 2004/0090647 A1 * | 5/2004 | Beard et al. | 358/1.14 |
| 2006/0133828 A1 * | 6/2006 | Rommelmann et al. | 399/8 |
| 2006/0178917 A1 | 8/2006 | Merriam et al. | |
| 2009/0144205 A1 * | 6/2009 | Hurry | 705/75 |

* cited by examiner

*Primary Examiner* — Gerardo Araque, Jr.
*Assistant Examiner* — Paul R Fisher
(74) *Attorney, Agent, or Firm* — Ronald E. Prass, Jr.; Prass LLP

(57) ABSTRACT

The disclosure relates to a computerized method and system for tracking consumer replaceable units (CRU) used in products such as printing systems. In the method the CRUM ID and destination of the consumable is retrieved on shipment from a supplier. When the consumer replaceable unit is installed in a device such as printing system, the device reports the installation back to a management application. The management application then proceeds to authorize the consumable for the reporting printing system, offer to transfer ownership, or when the printing system is not a managed device then offers a customer the option of being billed for the consumable. The management application has the option of disabling printing with customer replaceable unit when reassignment or intent to purchase is not available. When the consumable is returned the management application can ascertain if the customer replaceable unit was used by its assigned printing device.

9 Claims, 6 Drawing Sheets

SYSTEM AND METHOD TO VALIDATE CONSUMABLES INSTALLED IN A PRINTING SYSTEM

BACKGROUND

This disclosure relates in general to controlling replaceable units in a printing system, such as a digital printing apparatus. More specifically, the invention relates to a computerized method and system for identifying the specific imaging device in which the customer replaceable units is being used and to track proper usage of such customer replaceable units.

Many machines have replaceable sub-assemblies. These subassemblies may be arranged as unit called a cartridge, and if intended for replacement by the customer or machine owner, may be referred to as a customer replaceable unit (CRU). Examples of a CRU may include printer cartridge, toner cartridge, transfer assembly unit, photoconductive imaging unit, transfer roller, fuser or drum oil unit, and the like. It may be desirable for a CRU design to vary over the course of time due to manufacturing changes or to solve post-launch problems with the machine, the CRU, or a CRU and machine interaction. It is known to provide the CRU with a monitoring device commonly referred to as a CRUM (Customer Replaceable Unit Monitor). A CRUM is typically a memory device, such as a ROM, EEPROM, SRAM, or other suitable non-volatile memory device, provided in or on the cartridge. Information identifying the CRU is written on the EEPROM during manufacture of the CRUM. For example, information identifying a CRU as a developer cartridge and identifying the type of carrier, developer, and transfer mechanism contained in the developer cartridge may be written in the memory contained in the CRUM. When a CRU containing such a CRUM is installed in a machine, the machine's control unit reads the identifying information stored in the CRUM.

It is also important to ensure that CRUs (Customer Replaceable Units) are authentic and meet the original equipment manufacturer's (OEM) operational specifications. It is difficult to know after the CRUs leave the supplier whether it is being installed in a machine or being returned as an empty consumable. Actions such as reconfiguring or copying electronic chip based identification (CRUM ID) creates significant problems affecting not only the profits of the manufacturer but also legitimate resellers as well as entailing product functionality risks and reduced image quality for the customer.

For the reasons stated above, and for other reasons stated below which will become apparent to those skilled in the art upon reading and understanding the present specification, there is a need in the art for validating and tracking customer replaceable units.

SUMMARY

The disclosure relates to a computerized method and system for tracking consumer replaceable units (CRU) used in products such as printing systems. In the method the CRUM ID and destination of the consumable is retrieved on shipment from a supplier. When the consumer replaceable unit is installed in a device such as printing system, the device reports the installation back to a management application. The management application then proceeds to authorize the consumable for the reporting printing system, offer to transfer ownership, or when the printing system is not a managed device then offers a customer the option of being billed for the consumable. The management application has the option of disabling printing with customer replaceable unit when reassignment or intent to purchase is not available. When the consumable is returned the management application can ascertain if the customer replaceable unit was used by its assigned printing device.

DETAILED DESCRIPTION

Figure 1:
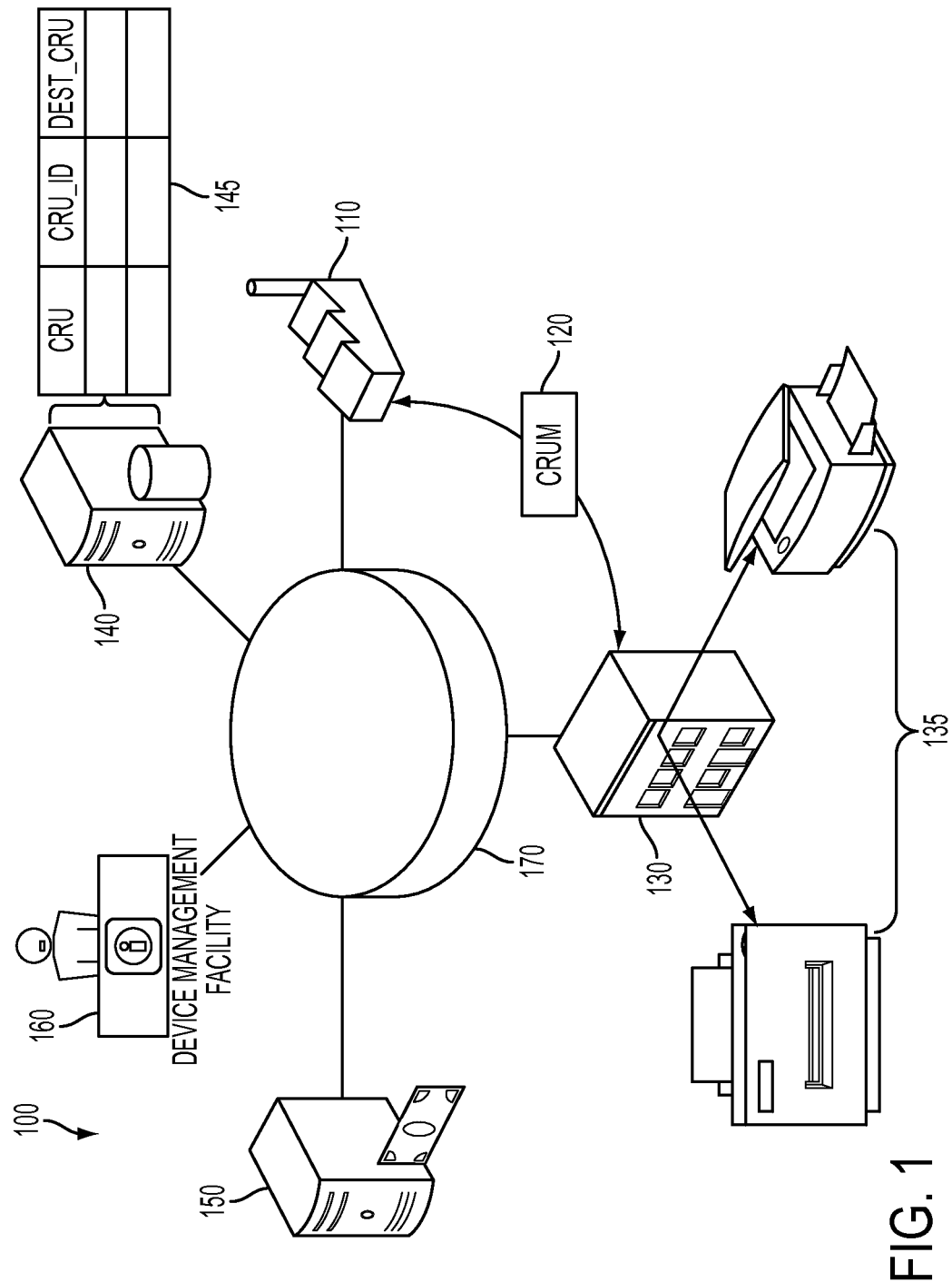
FIG. 1 is a block diagram of a network arrangement linking management application, supplier, and printer/copier device in accordance to an embodiment.

Aspects of the disclosed embodiments relate to methods for providing authorization for customer replaceable unit, and corresponding system and computer readable medium. The disclosed embodiments allow a management application to track a consumable when it is changed or returned to a supplier to see if it matches the one that was shipped for the printer. The management application applies different authorization strategies when the consumable is identified as not intended for that device and raise a flag indicating the consumable installed was not the one intended for that device. In another scenario when the consumable has been depleted and returned through a recycle program the CRUM ID will be read again and the management application will be notified that the consumable has been returned and the lifecycle completed.

In another aspect, the disclosed embodiment is to a method to track consumable serial number at time of shipping for comparison to the installed serial number of at least one customer replaceable unit in a printer system, the method comprising: creating a storage structure containing an identification code and a destination code for at least one customer replaceable unit; receiving from the printer system an identification code of at least one customer replaceable unit in the printer system; and analyzing the received identification code from the printer system to determine if the at least one customer replaceable unit is being used at an intended printing system.

In still another aspect the method further comprising: enabling the at least one customer replaceable unit when the at least one customer replaceable unit is determined to be for the printing system.

In a further aspect, the method further comprising: determining if the printing system is a managed printing device when the at least one customer replaceable unit is not intended for the printing system.

In another aspect, the method further comprising: determining for a managed printing device if the at least one customer replaceable unit can be reassigned to the printing system.

In another aspect, the method further comprising: reassigning the at least one customer replaceable unit to the printing system if it is determined that the at least one customer replaceable unit can be reassigned to the printing system.

In another aspect, the method further comprising: disabling printing with the at least one customer replaceable unit if it is determined that the at least one customer replaceable unit can not be reassigned to the printing system.

In another aspect, the method further comprising: determining intent to purchase the at least one customer replaceable unit when it is determined that the printing system is not a managed printing device; and enabling the at least one customer replaceable unit when it is determined that there is intent to purchase the at least one customer replaceable unit.

In a further aspect, the disclosed embodiment is to a computer-accessible medium having executable instructions to authorize at least one customer replaceable unit in a printer system, the executable instructions capable of directing a processor to perform: storing in a storage device a data structure containing an identification code and a destination code for at least one customer replaceable unit; receiving from the printer system an identification code of at least one customer replaceable unit in the printer system; and analyzing the received identification code from the printer system to determine if the at least one customer replaceable unit is being used at an intended printing system.

In another aspect, the disclosed embodiment is to a computerized system to track consumable serial number at time of shipping for comparison to the installed serial number of a customer replaceable unit comprising: a first computer that stores in a database serial numbers of customer replaceable units and their assigned printing devices; and a second computer that, when one or more of the customer replaceable units are replaced, receives output from a device, the output comprising the serial number of a customer replaceable unit that is replaced, and the second computer analyzing the serial number to determine if the specific customer replaceable unit was used by its assigned printing device.

In a further aspect, the disclosed embodiment is to a computerized system to track consumable serial number at time of shipping for comparison to the installed serial number of at least one customer replaceable unit in a printer system comprising: a first computer that stores in a database serial numbers of customer replaceable units and their assigned printing devices; and a second computer that, when one or more of the customer replaceable units are replaced, receives output from the printing system, the output comprising the serial number of a customer replaceable unit that is being installed, and the second computer analyzing the serial number to determine if the specific customer replaceable unit is installed in an assigned printing device.

The term "print media" generally refers to a usually flexible, sometimes curled, physical sheet of paper, plastic, or other suitable physical print media substrate for images, whether precut or web fed.

The term "printing device" or "printing system " as used herein refers to a digital copier or printer, scanner, image printing machine, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. "Printing system" can handle sheets, webs, marking materials, and the like. A printing system can place marks on any surface, and the like and is any machine that reads marks on input sheets; or any combination of such machines.

The term "management information base" (MIB) as used herein refers to a management information block, storage device, and can include any type of network management information and need not be a specific file, format, data structure or design. The MIB is at a minimum adapted to use Simple Network Management Protocol (SNMP).

A "network management station" refers to a monitoring device or computer that is operated by a human user to monitoring the status of the devices on a computer network.

A "print management station" refers to a monitoring device or computer that is operated by a human user such as a system administrator (SA).

A "purchase" any creation of or change in a business relationship between two parties with reference to the customer replaceable unit (CRU).

A "reassignment" is the creation of or change in a business relationship between two parties with reference to the customer replaceable unit (CRU).

FIG. 1 is a block diagram of a network arrangement 100 linking management application, supplier, and printer/copier device in accordance to an embodiment.

The device management facility 160, database 140, supplier 110, payment server 150, and facility 130 including printing devices 135 include computers and means to exchange information between each entity or a subgroup in each entity. The computer describe in detailed in FIG. 2 can operate in a networked environment using logical connections to one or more remote computers, such as printing devices 135. These logical connections are achieved by a communication device coupled to, or a part of the computer. Embodiments are not limited to a particular type of communications device. A remote computer can be another computer, a server, a router, a network PC, a client, a peer device or other common network node. The logical connections depicted as network 170 include a local-area network (LAN) and a wide-area network (WAN). Such networking environments are commonplace in offices, enterprise-wide computer networks, intranets, extranets and the Internet.

In the network arrangement 100 a supplier 110 is a provider of consumables or customer replaceable units (CRU) that are used within printing devices such as printing devices 135 at facility 130. The customer replaceable units can comprise photoreceptors, fusers, drums, rollers, toner cartridges, ink cartridges, and the like. Customer replaceable units are items that are well-known to those ordinarily skilled in the art, and Details can be found, for example, in U.S. Pat. Nos. 7,146,112 and 7,529,491, the complete disclosures of which are incorporated herein by reference. The provided CRUs contain serial numbers within memories, CRUM 120 described in detail at FIG. 3, for easy identification. The supplier also posses order information that is indicative of the target device that will be using the consumable such as CRUM 120. Further, when the CRU is returned for replenishment to supplier 110, the CRUM ID of the CRU and the printing device it was installed is also available for storing and analysis by a management application service or the like. A facility 130 places an order for a consumable with supplier 110.

An order is typically stored in a computer file at the supplier. An order can be represented inter alia as a text file, as a coded binary file, as an HTML formatted file, or as an XML formatted file. In one embodiment, an order is represented by a single XML file with a schema defined by the print system. This schema is referred to as the "native XML format" of the print service. In one embodiment, a single XML file can contain multiple orders. The supplier 110 will probably "serialize" each order. When an order is serialized, each line item in the order is decomposed into one or more material parts.

Each customer replaceable unit is assigned a unique serial number (CRUM ID). For example, in a large volume order each item would be assigned different serial numbers. Each serialized item can be individually managed and tracked. Further, line items with quantity greater than one are individually serialized.

Information from an order is made available to database 140 where the information is combined to form data structure 145. The data structure contains time series data entries for a plurality of printing devices or CRUs. The time series data entries for a plurality of printing devices or CRUs may be stored in a single data structure. In addition, alternate data structures for storing similarity information will be apparent to those of ordinary skill in the art based on this disclosure. As a minimum data structure 145 comprises a CRUM serial number field and printing device field indicative of where the CRU is to be installed or was installed. It should be understood that fields could be grouped and arranged to include facilities, regions, type of devices such as printers and scanners, or any other possible grouping that includes CRUM ID and Printer ID.

Device management facility (DMF) 160 is a computer running a management application service that provides monitoring and replenishment capabilities to printing devices for which it has been assigned. The DMF gathers data from printers such as printing devices 135, database 140, and periodically polls the network print driver such as printing devices 135 at location 130 to ascertain the management information block (MIB) of the printing device. The DMF captures the consumables currently in the printing devices, status, and alerts (warning messages) currently maintained by the computer memory within the printing device. This information can be pulled or pushed to other hosted environment for additional processing across all other managed services accounts.

A payment transaction server 150 may also be included to process payments at a Web site using third party services such as Datacash or WorldPay, or may process payments directly using payment server and banking software, along with a communication link to a bank.

The printing device 135 usually include an interface or digital front end (DFE) that can comprise a scanner, a graphic user interface, network connections, a standard service interface, and/or other input output connections. Additionally, the printing device 135 has one or more controller like processor 230 that is operatively connected to a print engine. Controllers and printing devices are items that are well known to those ordinarily skilled in the art (for example, see U.S. Pat. No. 7,237,771 the complete disclosure of which is incorporated herein by reference) and are available from manufacturers such as Xerox Corp., Norwalk Conn., USA. Therefore, a detailed discussion of such items is not included herein so as to focus the reader on the main features of the disclosed embodiments.

Figure 2:
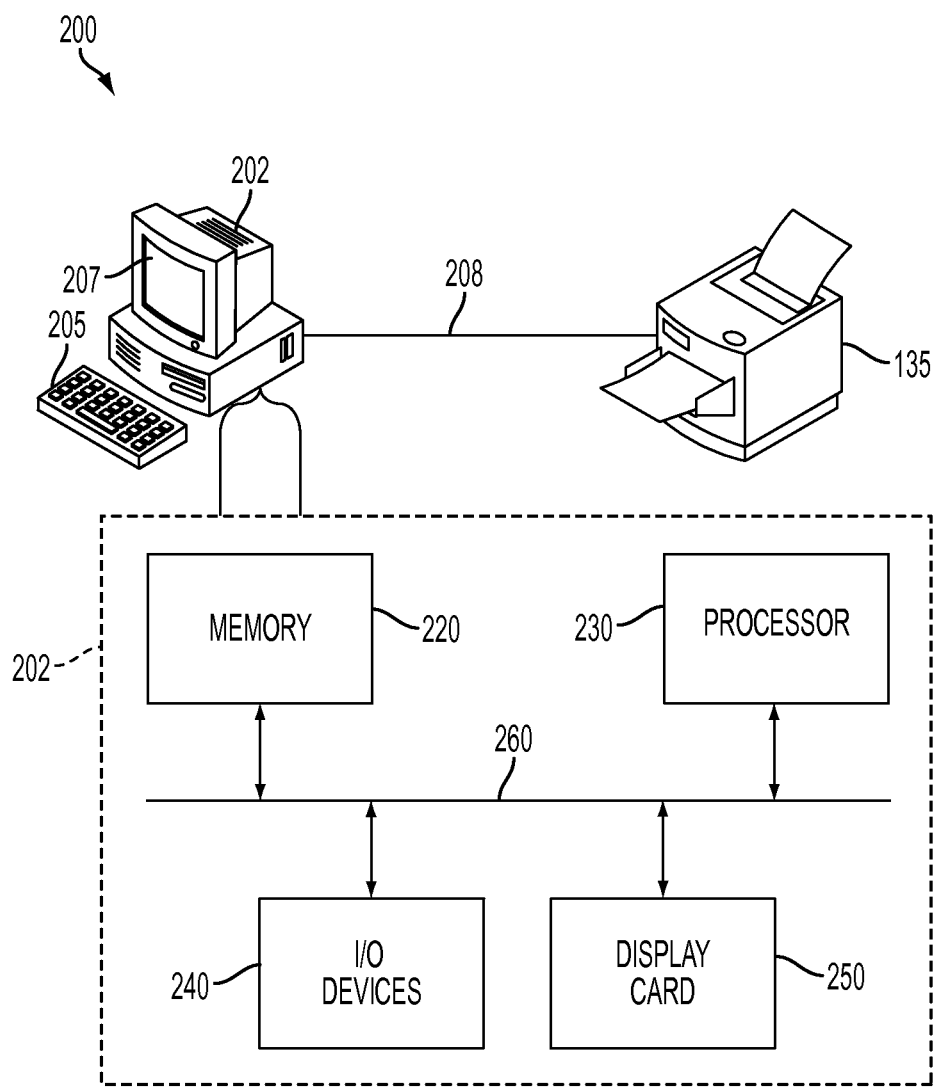
FIG. 2 is a simplified block diagram of an overview of a system configured to implement an application management service for tracking a customer replaceable units in accordance to an embodiment.

In the preferred embodiment of the network arrangement 100, the device management facility (DMF) 160 can access the network 170 or the internet through a gateway to interact with the records in database 140, receive data from supplier 110, or poll printers in facility 130. In other embodiments, the device management facility (DMF) 160 can reside on an intranet, an extranet, a local area network ("LAN"), a wide area network ("WAN"), or any other type of network or stand-alone computer as shown in FIG. 2. If the DMF resides on a network, then the computer or terminal at DMF 160 is any machine or device capable of connecting to that network. The DMF can be linked to the database, supplier, or printing devices by fiber optic cable, wireless system, by a gateway, by a network, or a combination of these linking devices. Device management facility (DFT) 160 and database 140 can be maintained at the same facility and can be components of a computer. Since DFT 160 will be performing centralized help desk system or device management system functions it would be better to maintain the information regarding orders and target device information at the device management facility to insure data integrity.

FIG. 2 is a simplified block diagram of an overview of a system 200 configured to implement an application management service for tracking a customer replaceable units in accordance to an embodiment. The system 200 may be embodied within devices such as a desktop computer 202, a laptop computer, a server, a handheld computer, a handheld communication device, or another type of computing or electronic device, or the like. The system 200 may include a memory 220, a processor 230, input/output devices 240, a display card 250 and a bus 260. The bus 260 may permit communication and transfer of signals among the components of the computing device such as computer 202.

Processor 230 may include at least one conventional processor or microprocessor that interprets and executes instructions. The processor 230 may be a general purpose processor or a special purpose integrated circuit, such as an ASIC, and may include more than one processor section. Additionally, the system 200 may include a plurality of processors 230.

Memory 220 may be a random access memory (RAM) or another type of dynamic storage device that stores information and instructions for execution by processor 230. Memory 220 may also include a read-only memory (ROM) which may include a conventional ROM device or another type of static storage device that stores static information and instructions for processor 230. The memory 220 may be any memory device that stores data for use by system 210.

Input/output devices 240 (I/O devices) may include one or more conventional input mechanisms that permit a user to input information to the system 200, such as a microphone, touchpad, keypad 205, keyboard, mouse, pen, stylus, voice recognition device, buttons, and the like, and output mechanisms such as one or more conventional mechanisms that output information to the user, including a display 207, one or more speakers, a storage medium, such as a memory, magnetic or optical disk, disk drive, a printer device, and the like, and/or interfaces for the above. The display 207 may typically be an LCD or CRT display as used on many conventional computing devices, or any other type of display device.

The system 200 may perform functions in response to processor 230 by executing sequences of instructions or instruction sets contained in a computer-readable medium, such as, for example, memory 220. Such instructions may be read into memory 220 from another computer-readable medium, such as a storage device, or from a separate device via a communication interface, or may be downloaded from an external source such as the Internet. The system 100 may be a stand-alone system, such as a personal computer, or may be connected to a network such as an intranet, the Internet, and the like.

The memory 220 may store instructions that may be executed by the processor to perform various functions. For example, the memory may store instructions to allow the system to perform various printing functions in association with a particular printer connected to the system.

The system 200 may have a printer 235 connected thereto for printing data such as images, text, and the like. In response to a user directing the computer 202 to print, for example. In response to such a print command, the processor 230 will typically cause the processing system to communicate 208 with the printer to perform the needed printing. When exchanging data between the management application service and other devices such as database 140 or printing devices 135, the computer running the management application service is considered the second computer while the other device is considered the first computer. As shown the first computer in printing device 135 communicate with a second computer 202 through a communication link 208.

Figure 3:
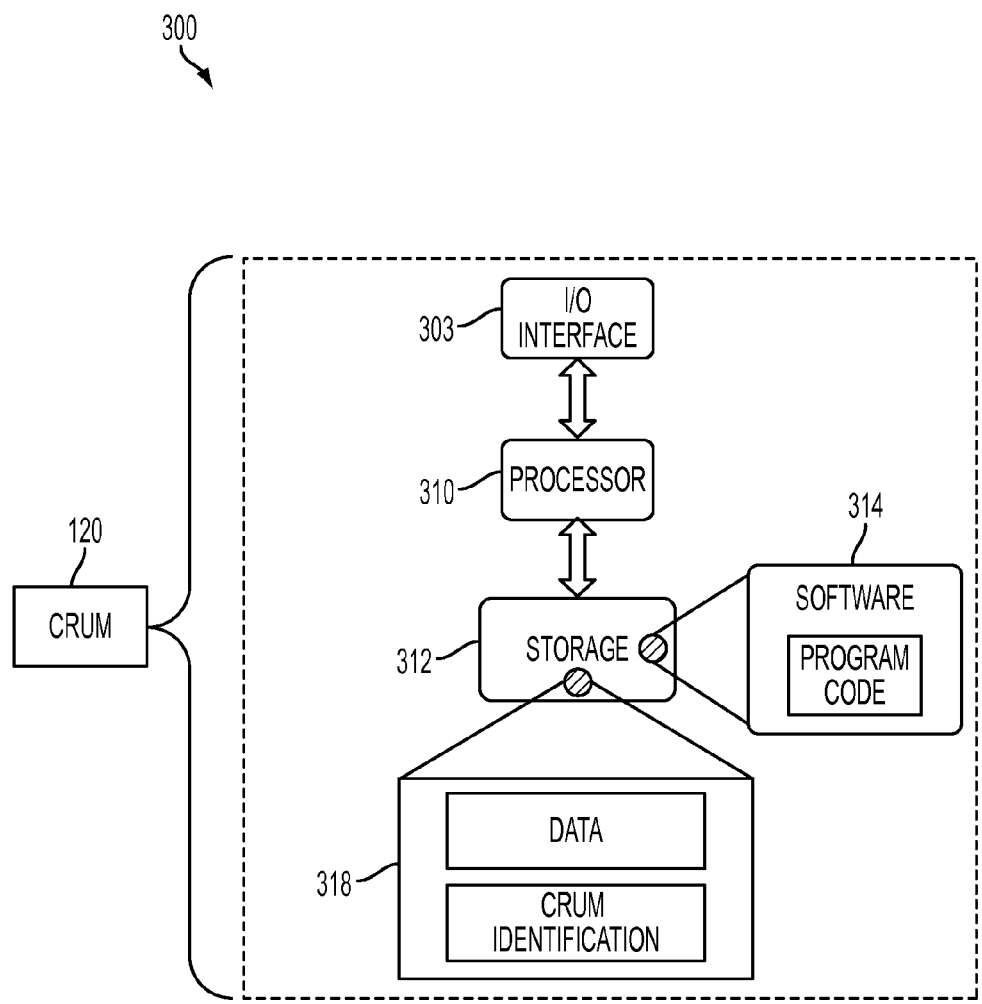
FIG. 3 is an illustration of the hardware and operating environment in a consumer replaceable unit monitor (CRUM) in accordance to an embodiment.

FIG. 3 is an illustration of the hardware and operating environment in a consumer replaceable unit monitor 120 in accordance to an embodiment. The CRUM 120 has an input/output (I/O) interface 303 for exchanging data with the various controllers in a printing system or with a management application service such as described in FIG. 1. CRUM 120 has a processor for gathering data and for controlling operations in the printing environment. CRUM 120 has a processor 310 for performing control and monitoring functions after compiling software 314 in storage device 312. The operating system of the processor 310 can be different than the OS of the controller or processor 230. Software component 314 may have executables or program code for performing data gathering, controlling, and security functions to protect the data from tampering or reading from non-authorized agents. The CRUM ID may be generated at the factory and recorded on the CRUM at memory unit 318. Memory unit 518 can include one or more cache, ROM, PROM, EPROM, EEPROM, flash, SRAM or other devices; however, the memory is not limited thereto. The CRUM ID can be a unique identifier assigned to chip in CRU, a serial number assigned at the factory, a random number assigned at the factory, a media access control address, key code element string, a validation code determined in situ or assigned by an external source, a market designator code, additional identification or manufacturing information, any other code that differentiates product type, manufacturer, or the like. The content of storage 512, especially CRUM ID and program code, is hidden from potential piracy by being stored in a secure area. This helps to prevent a potential pirate from determining or changing the CRUM ID. The same protection is afforded to the algorithm, data, and execution sequences at the printing system or data management service.

Figure 4:
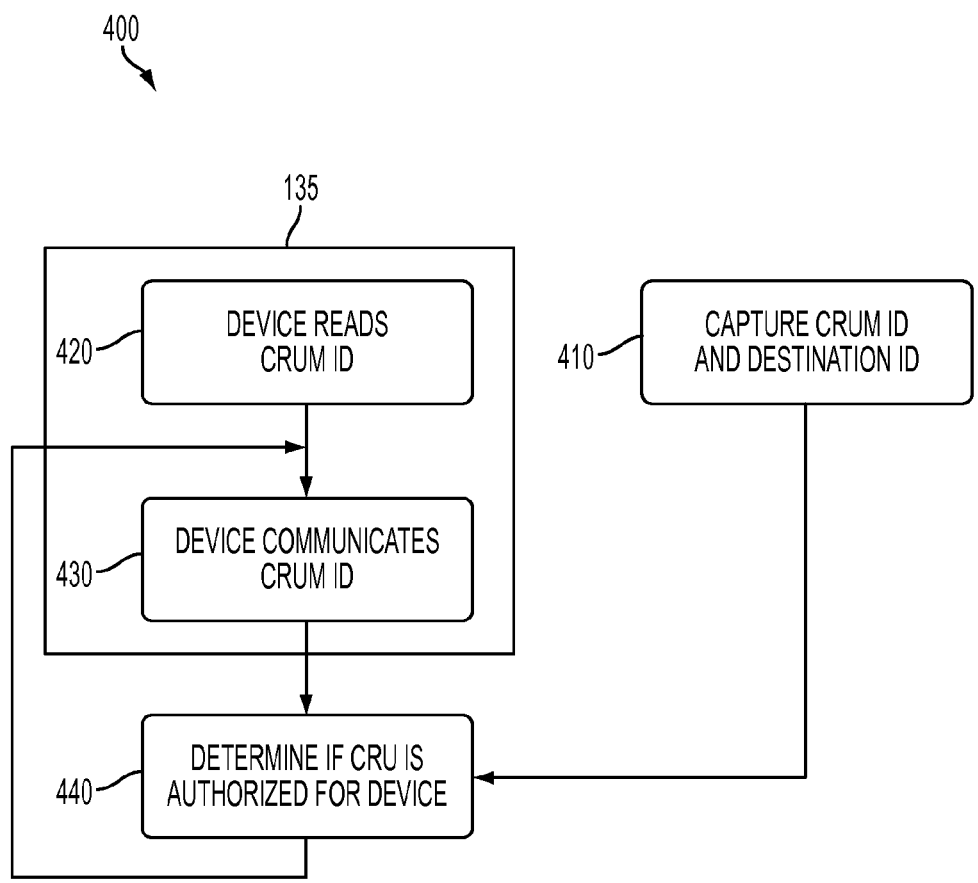
FIG. 4 is a flow chart of a method to authorize a customer replaceable unit in a printer system in accordance to an embodiment.

FIG. 4 is a flow chart of method 400 to authorize or authenticate a customer replaceable unit in a printer system in accordance to an embodiment. The method starts at 410 where the CRUM ID of a CRU such as CRUM 120 is capture along with the destination ID for the CRU. As noted above the destination ID can correspond to a specific printing device, an account designation, geographical location, or postal address. The destination ID can be included in memory unit 318 of CRUM 120 or it can be saved in database 140 and associated with the CRUM ID. Actions 420 and action 430 are performed at the printing system such as printing devices 135. In action 420, the printing device reads CRUM ID of the customer replaceable unit (CRU) such as CRUM 120. The CRUM ID is communicated to device management facility 160 running a management application service. Action 440 is then process the CRUM ID to determine if the CRU is authorized for the device. Method 400 is shown being performed by the printing system (communicating CRUM ID) and by an external computer located in the device management facility, it is also possible to have some or most of the functions be performed by CRUM 120 especially in cases where the Destination ID and the CRUM ID are included in CRUM 120 at the time of shipping.

Figure 5:
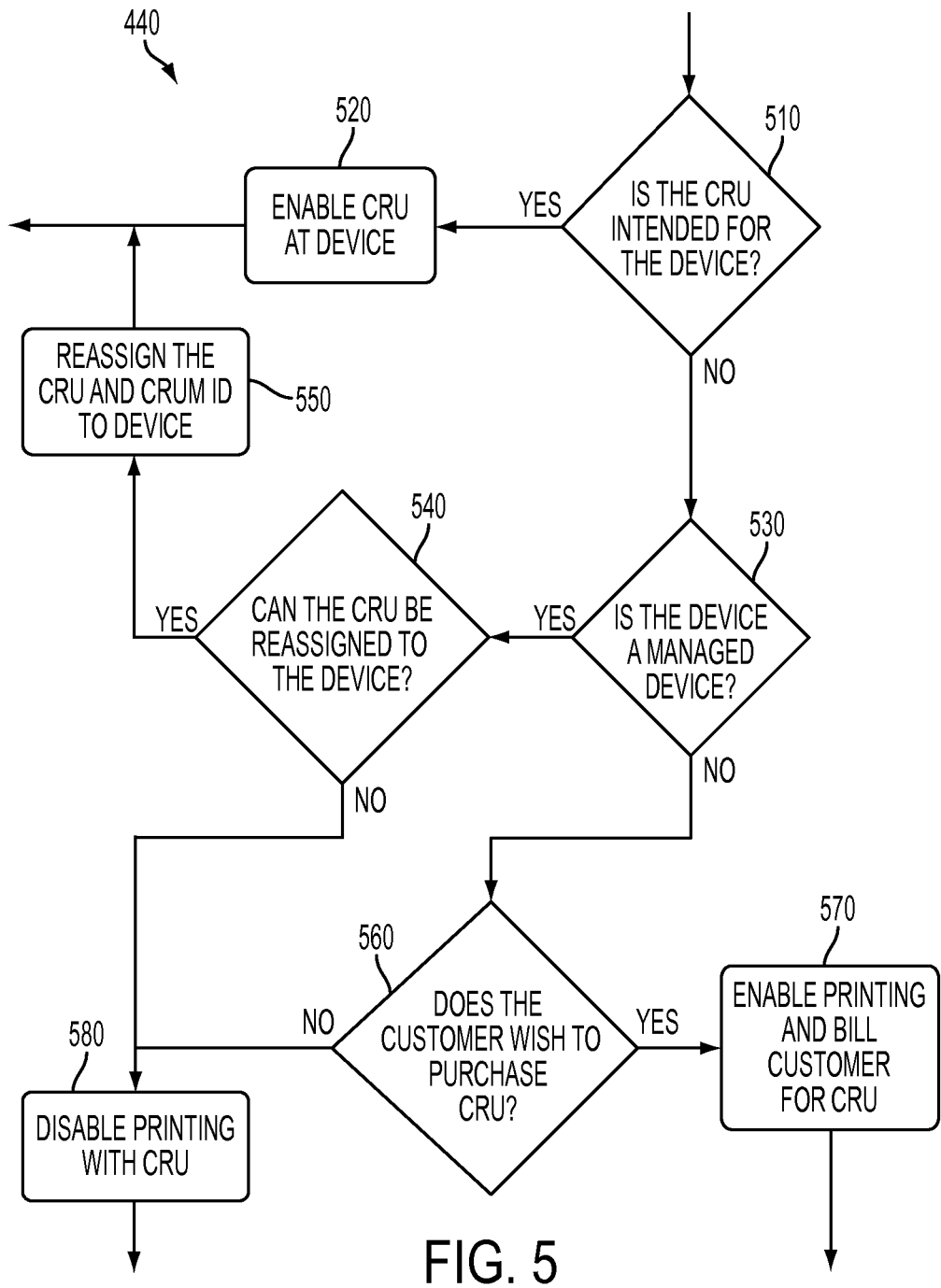
FIG. 5 is a flow chart of a method to determine if a specific customer replaceable unit is installed in an assigned printing device.

FIG. 5 is a flow chart of method 440 to determine if a specific customer replaceable unit is installed in an assigned printing device. The method begins with action 510. In action 510, the method tries to determine if the customer replaceable unit (CRU) is to be used at the printing system. In action 510 a comparison is done between the received CRUM ID and printer ID with the information in database 140 associating the CRU with the shipment information. If the received CRUM ID and Destination ID matched the saved CRUM ID and orbiter ID then control passes to action 520 where the CRUM is enable for the printer. If in action 510 does not produce a match then control passes to action 530. In action 530 a determination is made to ascertain if the printing system is being managed by one or more services running in a remote location. A managed service typically includes automated meter reads, automated supplies ordering, productivity reporting, assisted user self-help, remote diagnostics, and prognostics, among others.

Printing system management services are well known to those ordinarily skilled in the art, and Details can be found, for example, in U.S. Pat. No. 7,644,145, the complete disclosures of which are incorporated herein by reference. If in action 530 it is determined that the printing device is a managed device then control passes to action 540 for further processing. In action 540 a determination is made to see if the CRU can be assigned to the printing device. A reassigning of CRUs would be changing the assignment of the consumable to a specific printing device. Such a reassignment would be based on a prior agreement between the supplier and the en user such as facility 130. In action 550 reassignment is done by updating the data structure 145 with the new association/assignment of the CRU to the new printing device. The old record could be deleted and a new record created reflecting the change. If the CRU cannot be assigned control is passed to 680 and the printing device is prevented from using the CRU as a resource. In the event that the printing device is not a managed device, the customer in action 560 is queried through either by email or similar form of communication as to the intent to purchase the CRU. If the customer does not answer in the affirmative or takes to long to respond then control is passed to action 580 and the printing with that particular CRU is disabled. However, if the customer wishes to purchase the CRU control passes to action for further processing. In action 570 the customer is billed for the CRU. The customer is giving the choice of receiving an invoice through the regular course of business or prompted to follow link to a service such as payment server 150 for immediate processing. Also, in action 570 printing is enabled based on completing of the transaction at payment server 150. If the customer elects to be billed later than the CRU is enabled and a bill is later presented to the customer. If the customer wishes to pay then the CRU will be enabled after receiving an acknowledgment from payment server 150.

Figure 6:
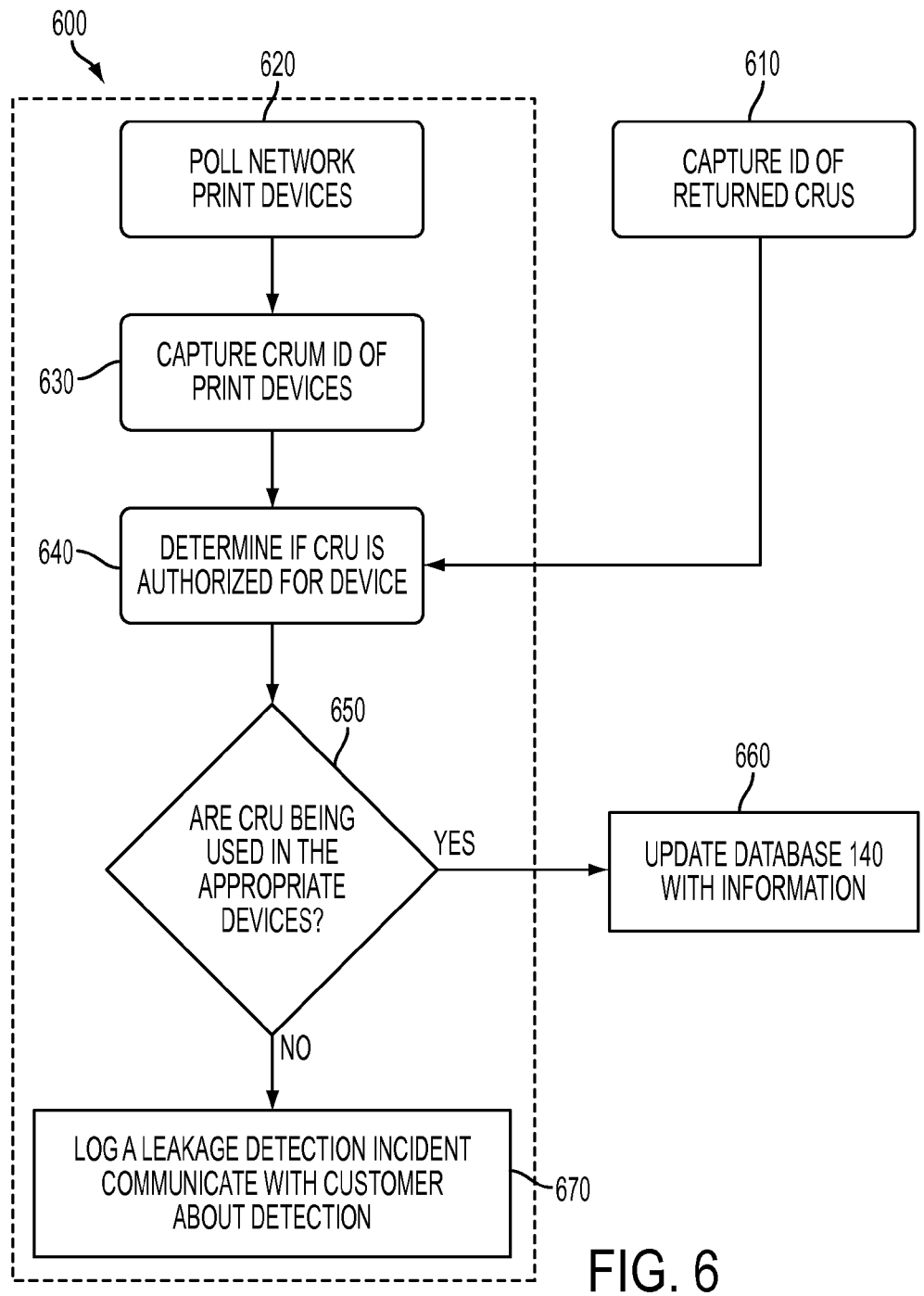
FIG. 6 is a flow chart of a method to validate returned CRUs to determine if a specific customer replaceable unit was associated with an assigned printing device.

FIG. 6 is a flow chart of a method 600 to validate returned CRUs to determine if a specific customer replaceable unit was associated with an assigned printing device.

Method 600 is for validating if the CRU is being used by its assigned printing device or if a returned CRU was being used by the assigned printing device. For the case where the CRU is returned to the supplier for replenishment the method begins with capturing the CRUM ID at action 610, and then analyzing at action 640 to see if the printer ID matches the printer ID in the database for the CRU. If it is determined in action 650 that a match exists then the database 140 is updated with the information. If however, there is no match between the returned CRU and the database then a log is created of the incident and the customer could be notified of the discrepancy or infraction. There are instances where the device management facility needs to poll the CRUs to pull data, such as the management information block, from the printing device to capture the status and alerts currently maintained by the printing device. The pulled data contains the CRUM ID of the individual devices. Action 620 polls the printing devices and action 630 captures the CRUM IDs from the CRU that are installed in the printing system. These CRUM IDs can be analyzed in action 640 to find discrepancies between the CRUs associated with shipped data and the compiled data from the polling process. In action in the instances where there is a match the database could be updated with the results. The instances where there are differences then a leakage detection incident is logged and the customer is notified. Methods 400, 440, and 600 constitute an authentication module, an analytical module to analyze the received identification code, a reassignment module to reassign the at least one customer replaceable unit, and prevention module to disable use of the at least one customer replaceable unit. The methods are able to analyze if the CRU is part of a purchase agreement by comparing the CRU identification code with shipment or other information. There are instances where the original purchase agreement contemplates reassignment of the CRU to third parties that are not part of the agreement. In some instances, reassignment of the CRU may or may not be appropriate because the purchase agreement may not allow such a transfer or because of compatibility issues that would reflect on the quality and increases in service calls.

Embodiments as disclosed herein may include computer-readable medium for carrying or having computer-executable instructions or data structures stored thereon. Such computer-readable medium can be any available medium that can be accessed by a general purpose or special purpose computer. By way of example, and not limitation, such computer-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard-wired, wireless, or combination thereof) to a computer, the computer properly views the connection as a computer-readable medium. Thus, any such connection is properly termed a computer-readable medium. Combinations of the above should also be included within the scope of the computer-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. The instructions for carrying out the functionality of the disclosed embodiments may be stored on such a computer-readable medium.

The instructions from a computer-readable medium may be used by an electronic device, such as computer 202, to cause the functionality of the embodiments to occur. These instructions may be loaded into a memory of the first electronic device to be executed by a processor as needed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method to track a consumable serial number at a time of shipping for comparison to an installed serial number of at least one customer replaceable unit in a printer system, the method comprising:

creating a storage structure containing an identification code for at least one customer replaceable unit and a destination code for an intended printer system to which the at least one customer replaceable unit is assigned for use;

receiving from a user printer system in which the at least one customer replaceable unit is installed for use an identification code of the at least one installed customer replaceable unit;

analyzing with a processor that references the storage structure the received identification code from the user printer system to determine whether the at least one installed customer replaceable unit is being used in the intended printer system to which it is assigned;

enabling the at least one installed customer replaceable unit when it is determined that the at least one installed customer replaceable unit is being used in the intended printer system to which it is assigned;

determining with the processor whether the user printer system in which the at least one installed customer replaceable unit is being used is a managed printer system when it is determined that the at least one installed customer replaceable unit is not being used in the intended printer system to which it is assigned;

determining with the processor for a managed printer system whether the at least one installed customer replaceable unit can be reassigned to the user printer system; and reassigning with the processor the at least one installed customer replaceable unit to the user printer system when it is determined that the at least one installed customer replaceable unit can be reassigned to the user printer system.

2. The method according to claim 1, further comprising:

disabling printing with the at least one installed customer replaceable unit when it is determined that the at least one installed customer replaceable unit cannot be reassigned to the user printer system.

3. The method according to claim 1, further comprising:

determining with the processor an intent to purchase the at least one installed customer replaceable unit when it is determined that the user printer system is not a managed printer system; and enabling the at least one installed customer replaceable unit when it is determined that there is an intent to purchase the at least one installed customer replaceable unit.

4. A non-transitory computer readable medium having executable instructions recorded thereon that, when executed by a processor, cause the processor to execute steps of a method comprising:

storing in a storage device a data structure containing an identification code for at least one customer replaceable unit and a destination code for an intended printer system to which the at least one customer replaceable unit is assigned for use;

receiving from a user printer system in which the at least one customer replaceable unit is installed for use an identification code of the at least one installed customer replaceable unit;

analyzing, with reference to the storage device, the received identification code from the user printer system to determine whether the at least one installed customer replaceable unit is being used in the intended printer system to which it is assigned;

enabling the at least one installed customer replaceable unit when it is determined that the at least one installed customer replaceable unit is being used in the intended printer system to which it is assigned;

determining if the user printer system in which the at least one installed customer replaceable unit is being used is a managed printer system when it is determined that the at least one installed customer replaceable unit is not being used in the intended printer system to which it is assigned;

determining for a managed printer system if the at least one installed customer replaceable unit can be reassigned to the user printer system; and reassigning the at least one installed customer replaceable unit to the user printer system when it is determined that the at least one installed customer replaceable unit can be reassigned to the user printer system.

5. The non-transitory computer-readable medium of claim 4, the method further comprising disabling printing with the at least one installed customer replaceable unit when it is determined that the at least one customer replaceable unit cannot be reassigned to the user printer system.

6. The non-transitory computer-readable medium of claim 4, the method further comprising:

determining an intent to purchase the at least one installed customer replaceable unit when it is determined that the user printer system is not a managed printer system; and enabling the at least one installed customer replaceable unit when it is determined that there is intent to purchase the at least one installed customer replaceable unit.

7. A computerized system to track consumable serial numbers at a time of shipping for comparison to an installed serial number of at least one customer replaceable unit in a printer system, comprising:

a first computer that stores in a database serial numbers of customer replaceable units and printing devices to which the customer replaceable units are respectively assigned; and a second computer that, when one or more of the customer replaceable units are replaced in a user printing device, receives an output from the user printing device, the output comprising serial numbers of the replaced customer replaceable unit, the second computer being further programmed to:

analyzing the serial number to determine whether the replaced customer replaceable unit is installed being used in an assigned printing device, enable the replaced customer replaceable unit when it is determined that the replaced customer replaceable unit is being used in an assigned printing device;

determine if the printing device in which the customer replaceable unit is replaced is a managed printing device when it is determined that the replaced customer replaceable unit is not being used in an assigned printing device;

determine for a managed printing device whether the at least one installed customer replaceable unit can be reassigned to the user printing device; and reassign the replaced customer replaceable unit to the user printing device when it is determined that the replaced customer replaceable unit can be reassigned to the user printing device.

8. The computerized system according to claim 7, the second computer being further programmed to:

disable printing with the replaced customer replaceable unit when it is determined that the replaced customer replaceable unit cannot be reassigned to the user printing device.

9. The computerized system according to claim 7, the second computer being further programmed to:

determine an intent to purchase the replaced customer replaceable unit when it is determined that the user printing device is not a managed printing device; and enabling the replaced customer replaceable unit when it is determined that there is an intent to purchase the replaced customer replaceable unit.

\* \* \* \* \*